United States Patent
Ent et al.

(10) Patent No.: US 9,880,586 B2
(45) Date of Patent: Jan. 30, 2018

(54) MODULAR DISPLAY SYSTEM INTERFACE

(71) Applicant: Lenovo (Singapore) Pte. Ltd., Singapore (SG)

(72) Inventors: Ali Kathryn Ent, Raleigh, NC (US); Cuong Huy Truong, Cary, NC (US); Cyan Godfrey, Chapel Hill, NC (US); Samuel Jackson Patterson, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 53 days.

(21) Appl. No.: 15/019,526

(22) Filed: Feb. 9, 2016

(65) Prior Publication Data

US 2017/0227986 A1    Aug. 10, 2017

(51) Int. Cl.
    *G06F 1/16*    (2006.01)

(52) U.S. Cl.
    CPC .................... *G06F 1/1632* (2013.01)

(58) Field of Classification Search
    CPC .............................................. G06F 1/1632
    USPC .................................................... 361/679.43
    See application file for complete search history.

(56) References Cited

U.S. PATENT DOCUMENTS

| | | | | |
|---|---|---|---|---|
| 5,619,397 A * | 4/1997 | Honda | ............ | G06F 1/1632 361/679.43 |
| 6,856,506 B2 * | 2/2005 | Doherty | ............ | G06F 1/1632 16/329 |
| 6,937,468 B2 * | 8/2005 | Lin | ............ | G06F 1/1632 361/679.41 |
| 7,800,896 B2 * | 9/2010 | Takizawa | ............ | G06F 1/1601 361/679.41 |
| 8,462,494 B2 * | 6/2013 | Chen | ............ | F16M 11/041 361/679.3 |
| 8,605,425 B2 * | 12/2013 | Zhou | ............ | H01R 13/635 361/679.43 |
| 8,773,850 B2 * | 7/2014 | Minaguchi | ............ | H04N 5/64 361/679.41 |
| 8,821,193 B2 * | 9/2014 | Vroom | ............ | H01R 13/512 439/540.1 |
| 8,929,059 B2 * | 1/2015 | Anwei | ............ | G06F 1/1632 248/229.22 |
| 8,951,067 B2 * | 2/2015 | Vroom | ............ | H01R 13/405 439/606 |
| 2008/0151489 A1 * | 6/2008 | Quijano | ............ | F16M 11/041 361/679.43 |
| 2008/0242360 A1 * | 10/2008 | Jang | ............ | G06F 1/1626 455/566 |

(Continued)

*Primary Examiner* — Hoa C Nguyen
*Assistant Examiner* — Keith Depew
(74) *Attorney, Agent, or Firm* — Ference & Associates LLC (57) ABSTRACT

One embodiment provides a system, including: an image display device with a recessed display connector; and an apparatus, the apparatus comprising: a housing, comprising: a base and an upper element; the upper element comprising a groove running lengthwise and open at both ends; a protruding display connector disposed substantially centrally within the groove; and an interface board, within the housing and operatively coupled to the display connector; wherein the image display device is attached to the groove of the apparatus via the recessed and protruding display connector. Other aspects are described and claimed.

20 Claims, 10 Drawing Sheets

(56) References Cited

U.S. PATENT DOCUMENTS

| | | | | |
|---|---|---|---|---|
| 2009/0270727 A1* | 10/2009 | Zhao | A61B 8/00 | 600/437 |
| 2011/0103003 A1* | 5/2011 | Ward | G06F 1/1624 | 361/679.41 |
| 2013/0088830 A1* | 4/2013 | Lim | G06F 1/1632 | 361/679.43 |
| 2014/0075061 A1* | 3/2014 | Fritchman | G06F 1/1632 | 710/62 |
| 2014/0168884 A1* | 6/2014 | Wylie | G06F 1/1654 | 361/679.43 |
| 2014/0168885 A1* | 6/2014 | Williams | G06F 1/1632 | 361/679.43 |
| 2014/0268543 A1* | 9/2014 | Vroom | G06F 1/1632 | 361/679.43 |
| 2014/0368990 A1* | 12/2014 | Gao | G06F 1/1632 | 361/679.43 |
| 2015/0036283 A1* | 2/2015 | Suckle | G06F 1/1632 | 361/679.43 |
| 2015/0077318 A1* | 3/2015 | Wang | G09G 3/2096 | 345/87 |
| 2015/0103483 A1* | 4/2015 | Lin | G06F 1/1626 | 361/679.43 |
| 2015/0116927 A1* | 4/2015 | Robinson | G06F 1/1632 | 361/679.43 |
| 2015/0185773 A1* | 7/2015 | Vroom | G06F 1/1632 | 361/679.41 |
| 2015/0268696 A1* | 9/2015 | Wu | G06F 1/1632 | 361/679.43 |
| 2015/0293563 A1* | 10/2015 | Wharrad | E05B 73/0082 | 726/20 |
| 2015/0378394 A1* | 12/2015 | Chen | G06F 1/1632 | 361/679.43 |
| 2016/0062402 A1* | 3/2016 | Matsumoto | G06F 1/1632 | 361/679.43 |
| 2016/0091925 A1* | 3/2016 | Ardisana, II | G06F 1/1632 | 361/679.43 |
| 2016/0138752 A1* | 5/2016 | Truong | F16M 11/10 | 248/74.1 |

\* cited by examiner

MODULAR DISPLAY SYSTEM INTERFACE

BACKGROUND

As computer technology has advanced so to has the technology associated with display devices. Displays have become, thinner, larger, brighter, and more capable (e.g., displaying higher resolution) than ever before. These larger, thinner, crisper displays, however, can be expensive depending on the type of technology used or the size of the display. In fact, for many computers, the display is one of the most costly components. The complexity and price of displays can even rival the total computer cost. This cost of replacing or upgrading monitors is especially large for a company or large entity when they attempt to replace a large number of workstations.

In addition, certain types of monitors may be needed for a particular type of job or task. For example, a graphics designer may need a large high resolution monitor as opposed to a typical office worker. The replacement of a monitor or monitors can be even more troublesome and costly on all-in-on devices, where in order to upgrade a monitor or display, on an all-in-on device, the entire system must be replaced. Thus, it would be advantageous for a company or even an individual if they were able to reduce the overall cost of monitor replacement or upgrade.

BRIEF SUMMARY

In summary, one aspect provides an apparatus, comprising: an apparatus, comprising: a housing comprising a base and an upper element; the upper element comprising a groove running lengthwise and open at both ends; a display connector disposed substantially centrally within the groove; and an interface board within the housing and operatively coupled to the display connector.

Another aspect provides a system, comprising: an image display device with a recessed display connector; and an apparatus, the apparatus comprising: a housing, comprising: a base and an upper element; the upper element comprising a groove running lengthwise and open at both ends; a protruding display connector disposed substantially centrally within the groove; and an interface board, within the housing and operatively coupled to the display connector; wherein the image display device is attached to the groove of the apparatus via the recessed and protruding display connector.

A further aspect provides a system, comprising: a computer system, comprising: a processor and a memory device operatively coupled to the processor; an image display device with a female display connector; and an apparatus, operatively coupled to the computer system, the apparatus comprising: a housing, comprising: a base and an upper element; the upper element comprising a groove running lengthwise and open at both ends; a male display connector disposed substantially centrally within the groove; and an interface board, within the housing and operatively coupled to the display connector; wherein the image display device is attached to the apparatus via the male and female display connector.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 6 (A-B) illustrates an example system including a stand, dock, mount accessory, and display panels.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As discussed herein, one of the major drawbacks of an all-in-one computer is the difficulty and expense to upgrade the device. This is due to the fact that the components (e.g., parts) of the computer cannot be replaced piecemeal. For example, an all-in-one computer may be rendered completely unusable if just a single component (e.g., motherboard, processor, display, etc.) fails or malfunctions. Precisely because they are "all-in-one," the customer typically has to replace the entire system, even if only the display panel fails.

However, this expense does not only apply to all-in-one systems, even regular standalone monitors are expensive to replace or upgrade. One of the reasons for the high cost is that a monitor is more than just a display panel. In fact, most existing monitors have complex circuitry included as internal components (e.g., power supply, scaler board, interface board, etc.) and built into the housing. Therefore, if a user or company wants to upgrade to a larger screen size or a higher resolution, they are forced to discard the entire monitor including the internal operating components discussed herein.

Although these internal components may have little effect on the size and resolution, they are still part of the monitor system and thus get discarded with the rest of the monitor. This is because, generally, these components are monitor specific, (i.e., they cannot be re-used to make a new larger screen function properly). Although not as costly, typically the stand is also replaced when a monitor is discarded. Thus, a large number of functioning parts are duplicated with the purchase of a new monitor. This in turn creates waste when the old monitors are disposed of, which have working components, as the components are discarded along with their display screen.

Although this can be a costly endeavor for a typical consumer, when a business upgrades their existing display devices (e.g., monitors) there are hidden costs in addition to the capital expense (e.g., purchasing the monitors). For example, typically, the information technology (IT) group will have to be brought in to complete the upgrade (e.g., connecting cables, un-boxing monitors, etc.), which costs time in labor. Although monitor replacement is not complex, it can be time consuming, especially when multiple cables must be disconnected, re-routed, and reconnected.

Additionally, display monitors typically come with a stand that requires a lot of packaging and assembly, which can increase storage costs, transport costs, labor costs and even waste removal costs. Finally, an additional unforeseen cost may be the downtime related to each user during the upgrade process. For example, if IT takes 10-20 minutes per station for the full installation, that can result in a large number of lost man hours for the staff involved in the upgrade.

Thus, a solution is needed that can decrease the overall costs (e.g., capital expense and operating expense) related to replacement or upgrade of a business' display devices. Therefore, one embodiment has interchangeable screens, in other words, in the all-in-one scenario, the computer and display panel can be fully disconnected, so if either fail, the entire product is not rendered useless. This allows a user to simply replace the display panel if needed (e.g., the display panel needs to be changed or replaced) or if the computer fails, a user may remove the remaining working display panel and connect it to a replacement computer portion. Thus, an embodiment allows customers to upgrade individual parts of the system, even the monitor of an all-in-one system which was not previously possible.

In addition to an all-in-one computer, typical computers (e.g., towers, stand alone computers) include a separate display monitor apart from the computer itself. Often the computer is set on the floor or in a remote location, so access to ports may be limited. Alternatively, the computer may be placed somewhere on a user's desk, which can take up a large amount of valuable table top space. Generally, cables connect the computer and display together, further cluttering the desk and workspace.

This technical issue presents a problem for a user in that it is costly to replace existing monitors and even when working, they can be cumbersome to deal with. An embodiment thus provides a much more convenient system based on a modular design. In one embodiment, a docking module/apparatus is connected to a computer, which allows for a display screen to be attached easily and without the cost of the additional electrical components (e.g., power supply, scaler board, interface board, etc.) of a regular monitor. In one embodiment, the docking module takes the form of a display stand or typical monitor stand.

The interchangeable display screen is possible because an embodiment eliminates an interface board. Typically, an interface board, which contains various ports and connections (e.g., power, video, etc.), is contained within a monitor device. In addition, an embodiment may also remove the power supply board and scaler board. A scaler board is generally a size-specific printed circuit boards (PCBs) from the display panel housing used to scale a rendered image to an appropriate display size for a specific device.

However, instead of including each of these devices within the monitor itself, an embodiment removes them and places them in a housing (e.g., a dock, all-in-one PC, etc.). This is possible because, an embodiment utilizes a single scaler PCB that has the ability to work with multiple display panels of various sizes. Similarly, the interface board is also universal in that it accepts a large range of connection types and transmits a large range of data formats. Each of the various display panels may be inserted into the universal dock (e.g., monitor stand, all-in-one PC, etc.). This allows an embodiment to utilize lighter, thinner, and less expensive display panel modules instead of full functioning monitors.

Thus, an embodiment allows for a technological improvement to the computing experience, namely, the ability to change screen sizes gives a customer the flexibility to swap displays between systems or have various sized screens available for use with the same computer system. As stated herein, this grants a large benefit to the user of all-in-one systems while still allowing a whole computer system to exist in one neat tidy package. This is because, the computer may be built right into the back of the display connector (e.g., monitor stand, universal dock, etc.), which can then easily connect to a display panel or multiple display panels of various sizes.

As discussed herein, an embodiment thus greatly improves deployment across an organization because swapping out a display panel for a replacement or upgraded panel (e.g., larger, high resolution, etc.) may be easily done by the user. Removing the need to involve the IT department (e.g., to run cables, install drivers, etc.) saves both time and money. The need to run cables is eliminated because the cables stay in place as the dock or all-in-one includes all of the required connections and cables. Thus, the entire replacement process is as simple as lifting out the original panel and swapping it with the new panel. In addition to saved man hours, a company can save on shipping and disposal costs as well. For example, multiple flat panel displays may be shipped in one compact package, thus minimizing size and weight thereby reducing the shipping costs and the space required for storage.

Accordingly, an embodiment provides a system, the system having an image display device (e.g., a display panel) with a first display connector, and an apparatus (e.g., dock station or all-in-one computer) with a second connector. In one embodiment, the apparatus housing is made up of a base to support the dock and display device. Typically, the base ensures stability when the monitor is sitting on a flat surface, such as a desk or workstation. Extending from the base is an intermediate element, such as a post, rod, rectangle, etc., which lifts the display panel up off the desk to a proper viewing height. In one embodiment, the intermediate element may be hollow and thus allow for cables or wires to be run through the intermediate device (e.g., connecting the base and the dock or upper element). The intermediate element then connects to the top portion (e.g., upper element), which has a groove designed to accept a flat panel. The groove also has a second display connector within it. This second connector is mated with the first connector (e.g., male and female connectors, protruding and recessed, etc.) on the image display device. As discussed herein, all of the typical monitor components are within the housing, thus reducing the cost and size of the display device.

The illustrated example embodiments will be best understood by reference to the figures. The following description is intended only by way of example, and simply illustrates certain example embodiments.

Figure 1:
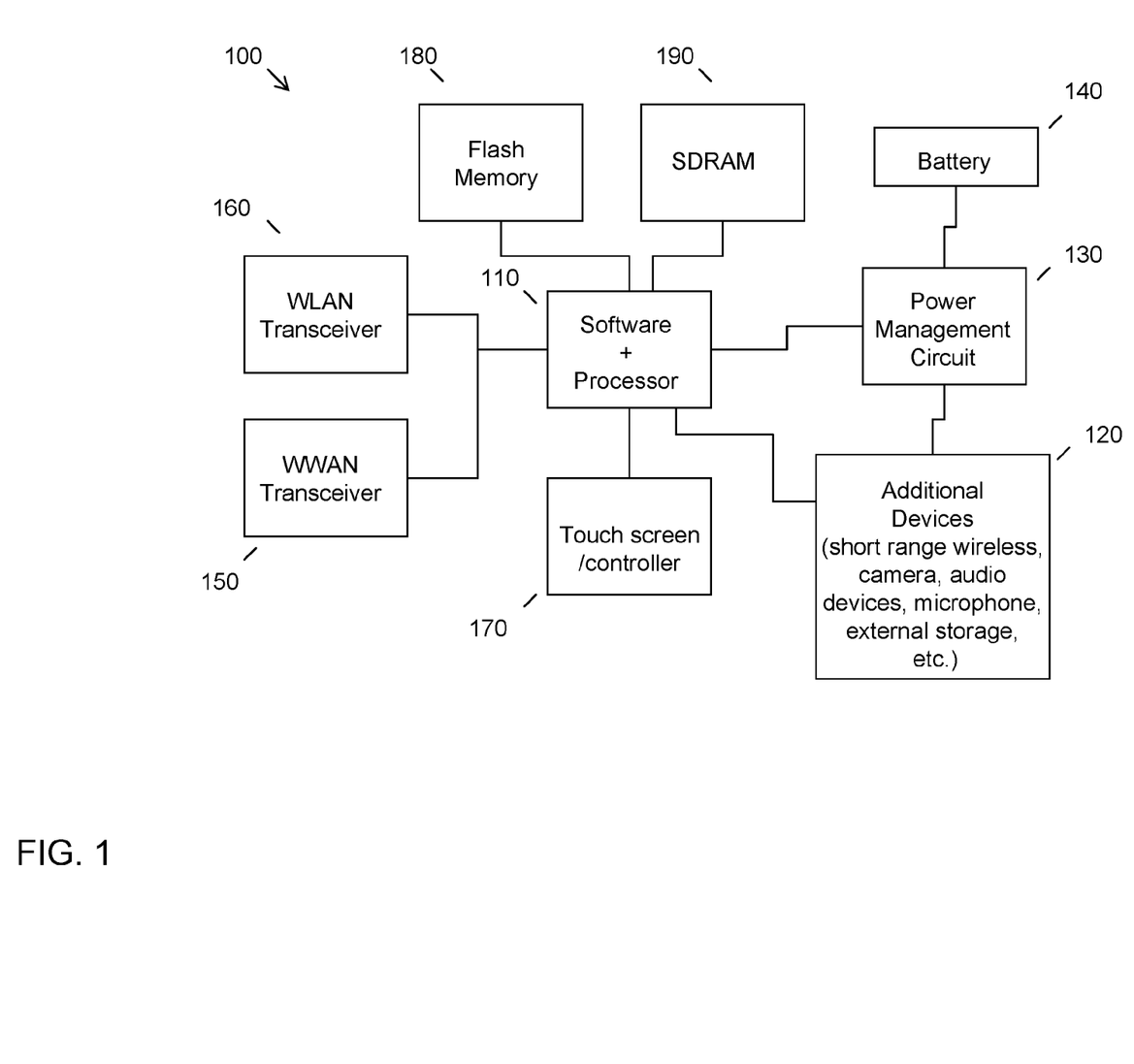
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included. System 100 often includes a touch screen 170 for data input and display/rendering. System 100 also typically includes various memory devices, for example flash memory 180 and SDRAM 190.

Figure 2:
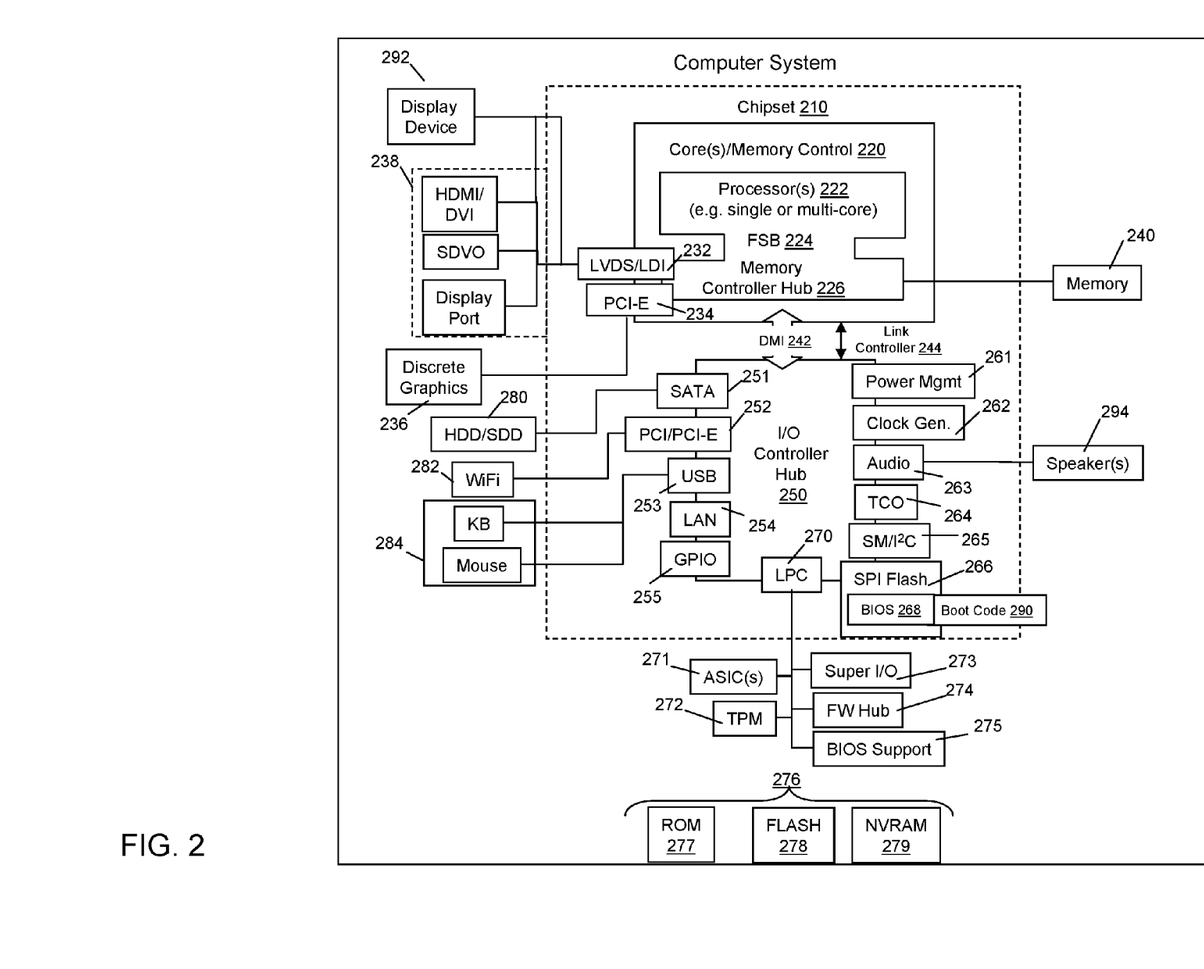
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in electronic devices generally. For example, the circuitry outlined in FIG. 2 may make up the circuitry included in a dock or a system to which the dock connects. Similarly, the circuitry outlined in FIG. 1 may make up the circuitry of a monitor or display panel, i.e., connectable to a mount accessory as further described herein. More or fewer components than outlined in FIG. 1 and/or FIG. 2 may be utilized. For example, the circuitry in FIG. 1 may be reduced such that the components include a display panel, a circuit board, and an interface for connecting to a dock. Such an arrangement or configuration permits the display panel to be very light weight, with the remaining circuitry and components necessary for data (audio and video data) display, input processing, etc., remaining in the dock and/or main system to which the dock connects.

Figure 3A:
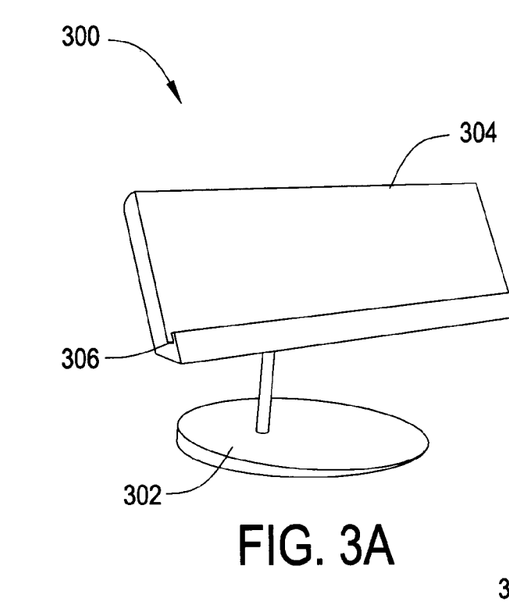
FIG. 3A illustrates an example dock system.

In an embodiment, illustrated by way of non-limiting example in FIG. 3A, a system includes a stand 300. In an embodiment and as further discussed herein, the stand may take the form of a monitor dock or an all-in-one computer station. The stand in turn may include a stabilizing base element 302 that supports the overall system. By way of example, the stabilizing base element 302 may be formed of a material such as metal or may be a composite of several materials in order to provide a mass that lowers the center of gravity of the stand 300. This reduces the chance of the system tipping when a fully inclusive system is formed (i.e., when an image display device is attached such as that shown in FIG. 3B).

Additionally, in one embodiment, the base may serve as a housing or conduit for cables or connectors. Thus, connections may be made at the base, for example, such as that shown at 303. These connections may come from a detached main computer system (not shown). This allows an embodiment to further reduce desk clutter and eliminate the need to run cables or wires up to the docking area, cradle, or all-in-one at 304.

In a further embodiment, the base may have an intermediate element extending from it at 305. The intermediate element may be formed of a material such as metal or may be a composite of several materials to provide a lightweight yet strong structure as to support the docking area 304. In one embodiment, the intermediate element may be hollow, allowing it to act as a conduit for connecting wires (e.g., power and data cables).

In another embodiment, the docking area 304 houses electrical components needed to power and operate a display panel. As discussed herein, these components are typically stored within the housing of the monitor itself. However, storing them in a universal dock or all-in-one system allows for the overall cost of panel replacement to be lower. This is possible, because the components are universal in nature, and adjust based on characteristics of the attached monitor (e.g., type, style, size, etc.) In an embodiment, the dock 304 may house a power supply (e.g., a full wave rectifier circuit) that allows for alternating current (e.g., that typically available from an outlet) to be converted into direct current (e.g., that needed to power a typical monitor).

Additionally, in an embodiment, the housing my also contain a scaler card. A scaler card is a printed circuit board that is typically included in a monitor or display device that receives rendered video output. The scaler then scales the video output to the proper size for the specific monitor. This method of using display specific cards is one of the reasons display devices have such a high price point. Thus, an embodiment utilizes a universal scaler that can determined the display panel currently in place on the dock or all-in-one computer and scale the rendered images or video to the correct size.

In a further embodiment, the housing may also contain an interface card. The interface card, which is typically within a monitor housing, allows for connection to be made to a display device. For example, an interface board may receive power to operate a display device, or data related to images to be rendered on the display device. By way of non-limiting example, an interface board may accept one or more of the following connector types: one-link, mobile high definition link, HDBaseT, DiiVA, DisplayPort, high definition multimedia interface, serial digital interface, digital visual interface, etc either alone or in tandem with a power source if the video standard fails to support power.

In another embodiment, the intermediate element connects the base to the dock or all-in-one. This top section, herein referred to as the dock, cradle, all-in-one, etc. comprises a groove at 306 running lengthwise along dock 304 and is open at both ends. As shown in FIG. 3C, the groove has a back plate 307, a bottom 308 and a front lip 309 which run the length of the dock. This groove allows for an image display device (e.g., display panel) to rest securely within the dock. Being open at both ends further allows the dock to accommodate display panels of various sizes (e.g., panels that are longer than the dock itself, such as that shown in FIG. 3B.

Figure 4:
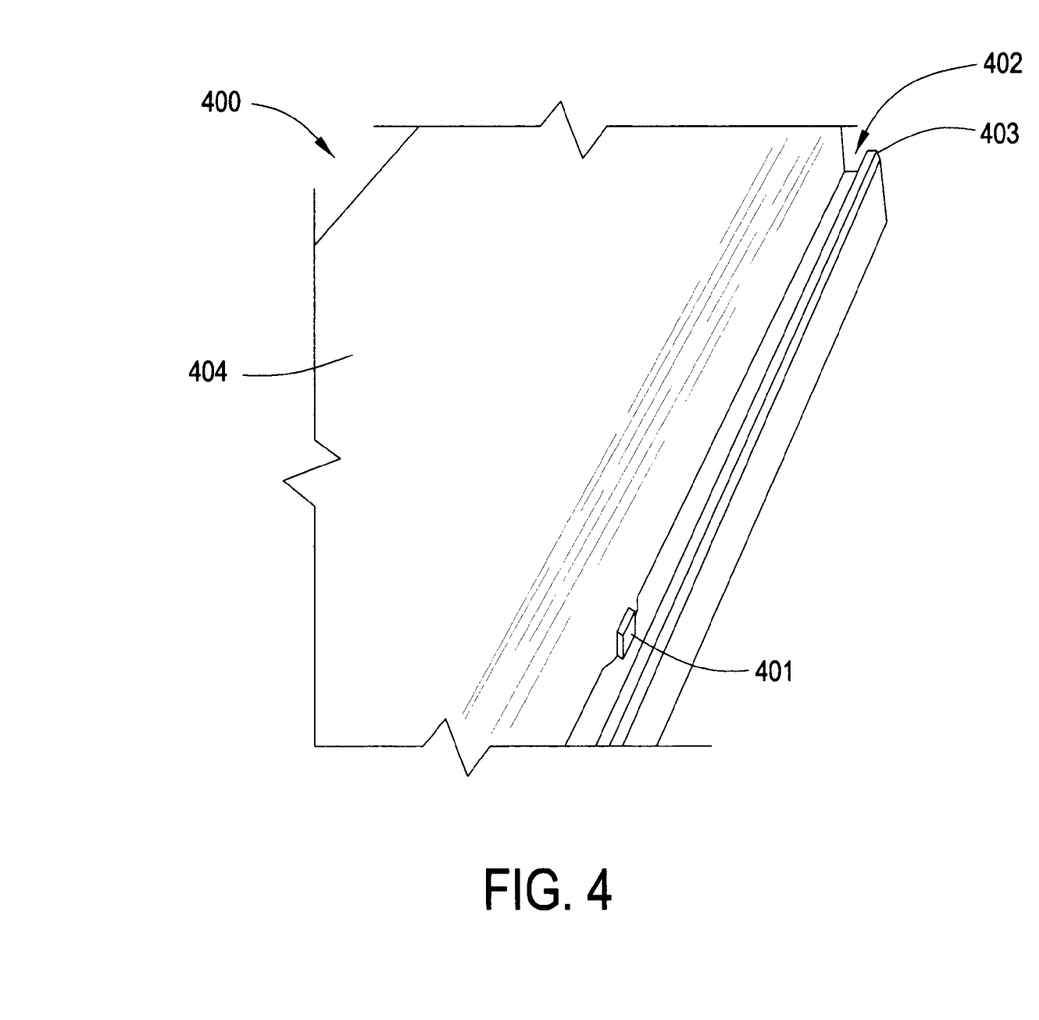
FIG. 4 illustrates a close up of a connector and groove within the dock system.

Referring now to FIG. 4, the dock 400 may include a male or protruding connector, shown at 401, to which a display panel (not illustrated in FIG. 4) may attach. The male connector 401 may be placed or disposed within the groove 402 that runs lengthwise in the dock as discussed herein. The spacing of the groove 402 between an outer lip 403 and a back plate 404 of the dock 400 may be sized appropriately to accommodate insertion of a mounting accessory, a display panel, or both. The male connector of the dock 400 may include power pins and data pins to communicate power and data to and from a display panel, either connected directly to the dock 400 via male connector 401, or as connected to the mounting accessory and thus to the dock. In a further embodiment, the male display connector may be moveable about an axis coincident with the groove, thus allowing the male connector 404 to slide up and down the groove 405 to accommodate non-uniform display panels.

Additionally, an embodiment may have one or more data ports located on the stand 300. These ports may be located on the base portion 302, the intermediate portion 305, or the dock portion 304. The one or more data ports allow easy access to a stand alone computer which may be out of reach or difficult to reach due to its location (e.g., on the floor under a desk). Thus, the one or more data ports may allow for the transfer of data from an external device (e.g., an external hard drive, a memory card/stick, peripheral device, etc.). In one embodiment, the one or more data ports may be for example, a display port, a serial advanced technology attachment, an external serial advanced technology attachment, a FireWire port, a serial port, a small computer system interface, and a universal serial bus. FIREWIRE is a registered trademark of Apple Computer, Inc., in the United States and other countries.

Figure 3B:
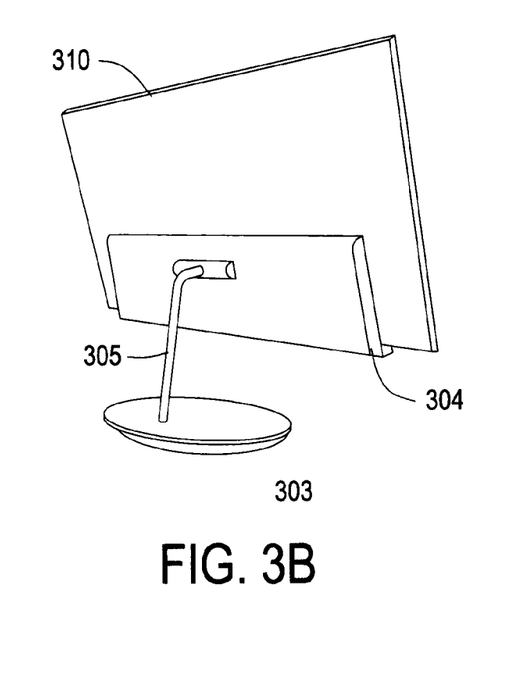
FIG. 3B illustrates another example dock system.
Figure 3C:
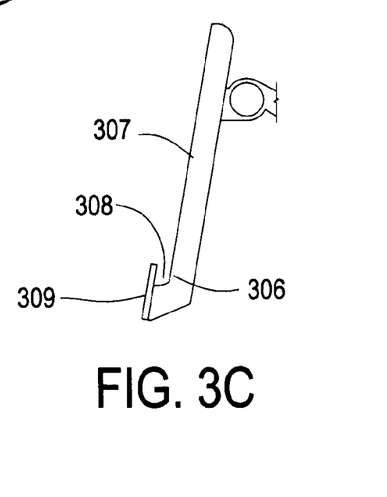
FIG. 3C illustrates another example dock system.
Figure 5:
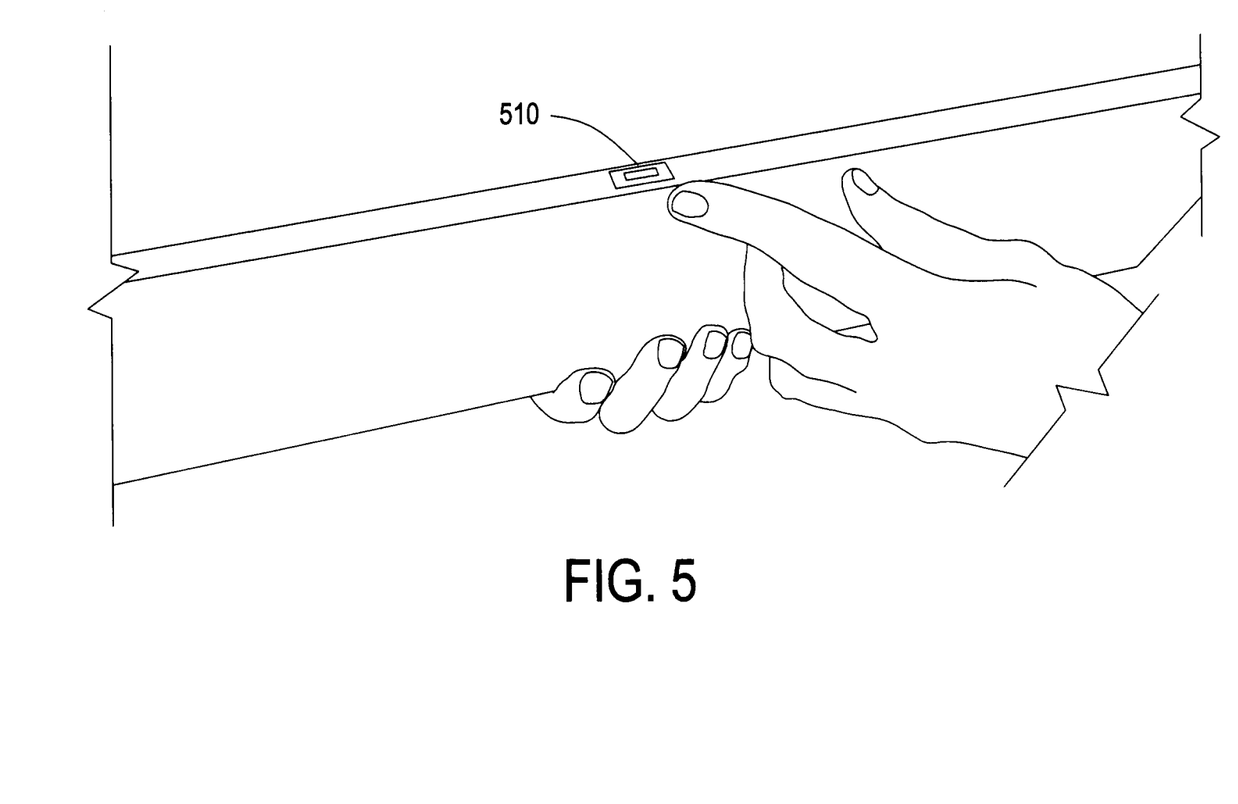
FIG. 5 illustrates an example display device and a connection port.

In another embodiment, an image display device such as that shown at 310 in FIG. 3B has a female or recessed display connector (shown in FIG. 5 at 510). In an embodiment, the image display device may maintain a thin profile because the display housing does not contain any additional electrical components (e.g., a power supply, scaler, etc.). In a further embodiment, the male connector on the dock and the female connector on the display device may be any type of connector that allows data and power to transfer between the two devices. For example, an embodiment may use a connector such as: one-link, mobile high definition link, HDBaseT, DiiVA, DisplayPort, high definition multimedia interface, serial digital interface, digital visual interface, etc., and either alone or in tandem with a power source if the video standard fails to support power.

Thus, an embodiment provides that a connector (e.g., display connector) in the base of the panel makes the electrical connection with the connector in the dock, and thereby links the scaler board, interface board, power supply, and display panel together. Thus, when a display panel is switched out, all other components to make the display panel function (e.g., scaler board, power supply, interface board, etc.) remain in the dock module and are used to make the replacement display panel function. For simplicity purposes, the components (i.e., scaler board, interface board, power supply, etc.) will be discussed as always being removed from the display device herein. However, these are non-limiting examples, and it should be clear to one skilled in the art that these components may be relocated as a group or individually. For example, the scaler board may remain in the display device while the interface board and power supply are removed. In an alternative example, the scaler and interface board may remain in the display device and only the power supply is removed.

Thus, an embodiment saves costs as there are fewer duplicated unused components in the switched out panel. A further embodiment provides additional ports, which are easily accessible and help to maintain a less cluttered work environment (e.g., no cables may be required to connect a computer directly to a display). An embodiment therefore maintains the benefits of a traditional all-in-one computer while also allowing for easy upgradability and cost savings.

In a further embodiment, a mount accessory may connect physically and electrically to a dock or all-in-one. The mount accessory may include a female port that connects to a male connector provided by the dock, and the mount accessory may include two or more male connectors, e.g., on the ledges or base areas, for insertion to female ports on the display panels. Thus, no cables are required for connecting the display panels to the main system (e.g., workstation or desktop computer).

The mount accessory may include a ledge or base area in the form of two ledges (like easels), side-by-side, with male connectors to operatively couple two display panels (like canvases). The two ledges can be adjusted on a central or main hinge to desirable viewing angles (like an open book that may be opened to varying degree). Connectors of the ledges may be moveable, e.g., sideways along the lateral or long axes of the ledges, to align with the male connectors with female connectors or ports of different sized display panels.

The lateral alignment or height of the two ledges may be fixed at the same level so that dual monitors of the same size are automatically aligned in height, creating a clean look. When the dual monitor mount accessory is connected to a single dock or stand, the footprint on the desk is minimal when compared to two monitors on two stands side-by-side on a desk.

In one embodiment, illustrated by way of non-limiting example in FIG. 6(A-B), a system 600 includes a stand 601. The stand in turn may include a stabilizing base element 602 that supports the overall system 600. By way of example, the stabilizing base element 602 may be formed of a material such as metal or may be a composite of several materials in order to provide a mass that lowers the center of gravity of the stand 601. This reduces the chance of the system 600 instability when a fully inclusive system 600 (i.e., having mount accessory 604 and display panel(s) 630, 631) is formed.

The stand 601 may connect to or be integrated with a dock 603 at an upper part of the stand 601. The dock 603 may be operatively coupled to the stabilizing base element 602, e.g., if one or more wires (not shown) extend from the stabilizing base element 602 to connect power and/or data for the dock, e.g., a wired connection to a main computer system (not shown).

Figure 6A:
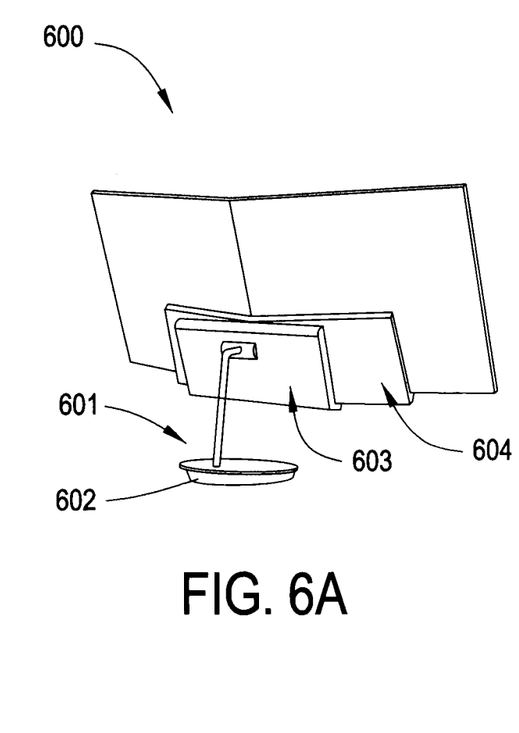
Figure 6B:
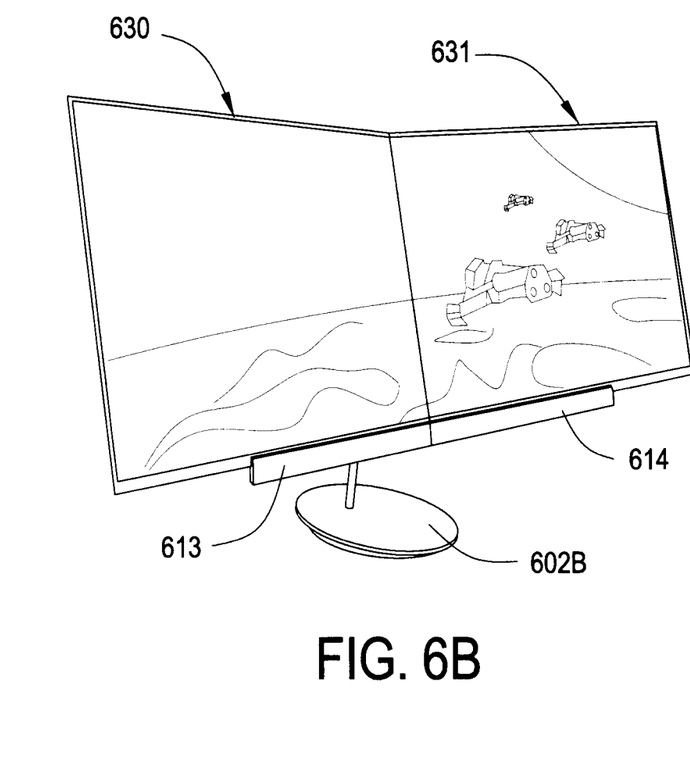

As illustrated in FIG. 6A, the dock 603 and the display panels (630, 631 in FIG. 6B) connect via a mount accessory 604. The mount accessory 604 includes power and data connectors for both the dock 603 and the display panels 630, 631, as further described herein. As illustrated in FIG. 6B, the mount accessory 604 supports display panels 630, 631 by inclusion of ledges 613, 614, similar to an easel supporting canvases. The long edges may include audio speakers for output of audio data, alone or in connection with display of video data on the display panel(s).

Figure 7:
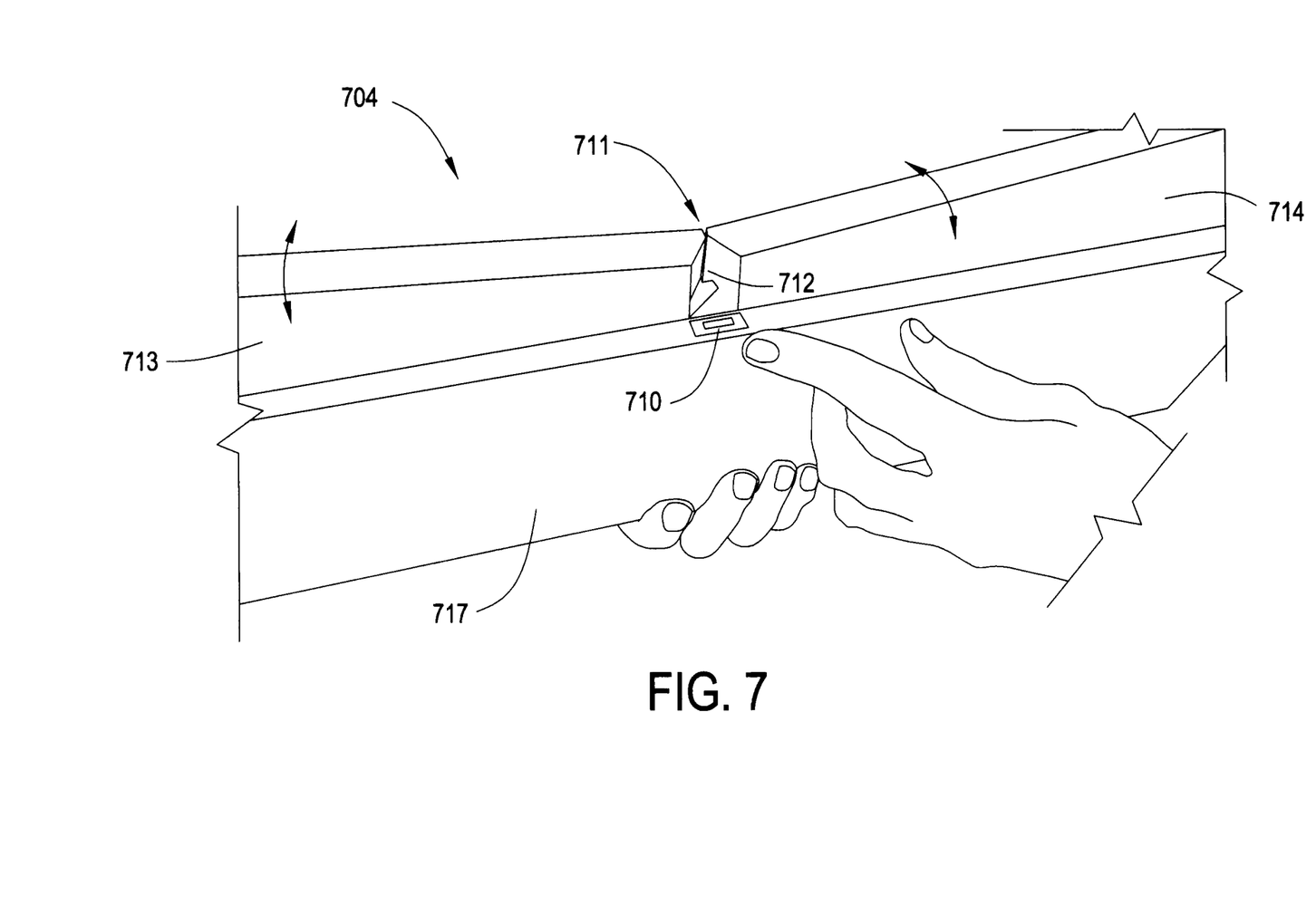
FIG. 7 illustrates an underside of an example mount accessory.

As shown in FIG. 7, the underside of a mount accessory 704 includes a centrally located female port 710 disposed in a central area 711. This female connector or port 510 attaches to the male connector of the dock 401. Referring to FIG. 4, as has been described herein, a display panel having a similar female connector or port, and similarly sized bezel or casing, may be directly inserted into the ledge 402 of the dock and connected to the male connector 401 of the dock. A central area 711 of the mount accessory 704 comprises a centrally located hinge 712, partially visible from in the view of FIG. 7.

Two long edges 713, 714 are hingedly attached to the centrally located hinge 712 and extend from the central area 711. Each of the two long edges 713, 714 move about the centrally located hinge 712 such that they may be repositioned out (fore) and back (aft) with respect to the back plate 717 of the mount accessory 704 and thus with the same movement with respect to the back plate 404 of the dock.

Figure 8:
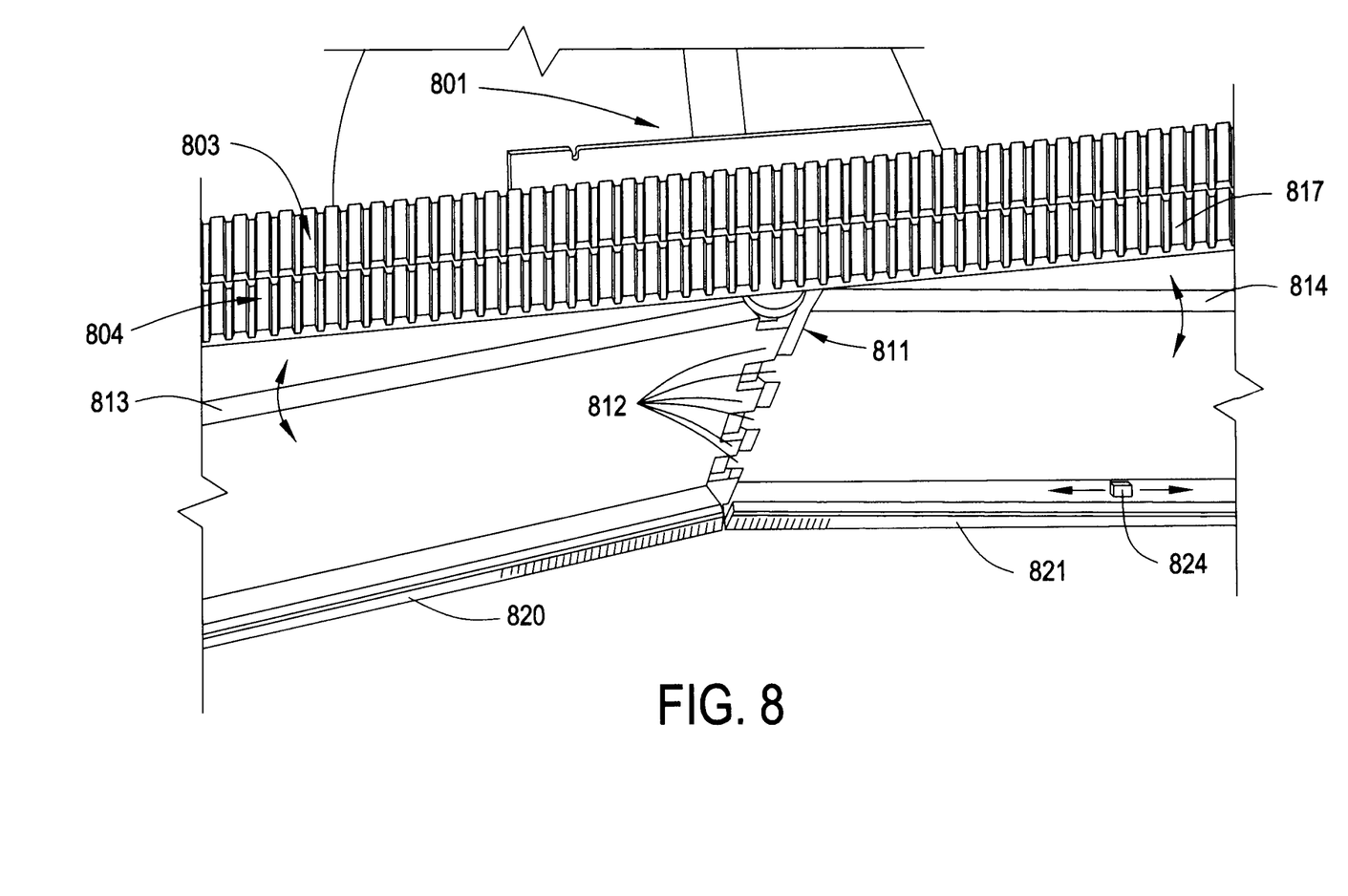
FIG. 8 illustrates an example top view of a mount accessory situated in a dock.

In FIG. 8 a top view illustrates the mount accessory 804 seated into the dock 803. The arm of the stand 801 can be seen attached to a rear surface of the dock 803.

The front of the mount accessory 804 includes a back plate 817 that abuts the front wall or face of the dock 804. The two long edges 813, 814 are hingedly connected via central hinge 812 in central area 811. The two long edges 813, 814 may pivot about the central hinge 812 to more fore and aft, as illustrated by the arrows of FIG. 8.

The two long edges 813, 814 further comprise ledges 820, 821. Each of the two ledges comprises a male connector, one of which is illustrated at 824, disposed therein. The male connector 824 of ledge 821 may be the same as male connector 409 of the dock 403. The male connector 824 of the ledge 821 may move laterally or along a long axis of the long edge 814, as indicated by the arrows in FIG. 8 surrounding male connector 824.

Figure 9:
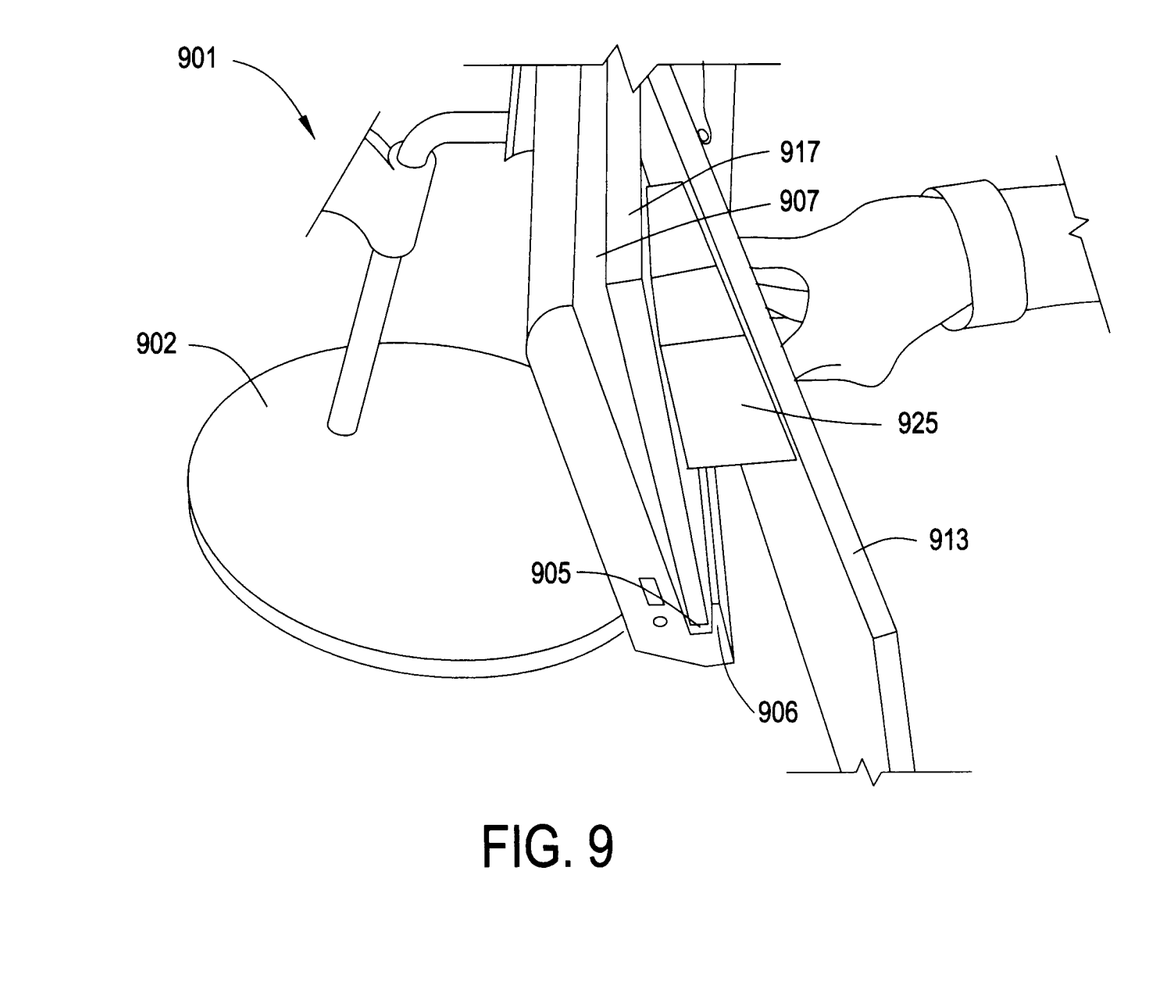
FIG. 9 illustrates a side view of a mount accessory being placed in a dock.

FIG. 9 offers a side view of the system in which the stabilizing base 902 has an arm extending there-from to form a stand 901 to support the dock, mount accessory, and ultimate the display panel(s) (not illustrated in FIG. 9). As shown, the front wall or face 907 of the dock provides a surface that will abut the back plate 917 of the mount accessory. The mount accessory is seated into the ledge 905 of the dock, connecting with a male connector of the dock via female connector or port at the bottom of the mount accessory (refer to FIG. 4 and FIG. 5). The front lip 906 of the dock secures the back plate 917 of the mount accessory therein. The mount accessory may include a wedge 925 or other shaped element to bias the amount that each long edge, e.g., long edge 913 in this example, rotates about the central hinge.

Thus, an embodiment provides a mount accessory that can accommodate one or more display panels. The mount accessory permits mounting on a dock, and in turn mounting of display panel(s) to the mount accessory such that the display panel(s) seated thereon are operatively connected to the dock, which may be an inclusive system, or may provide further connection to another system (e.g., tower type desktop computer).

Figure 10:
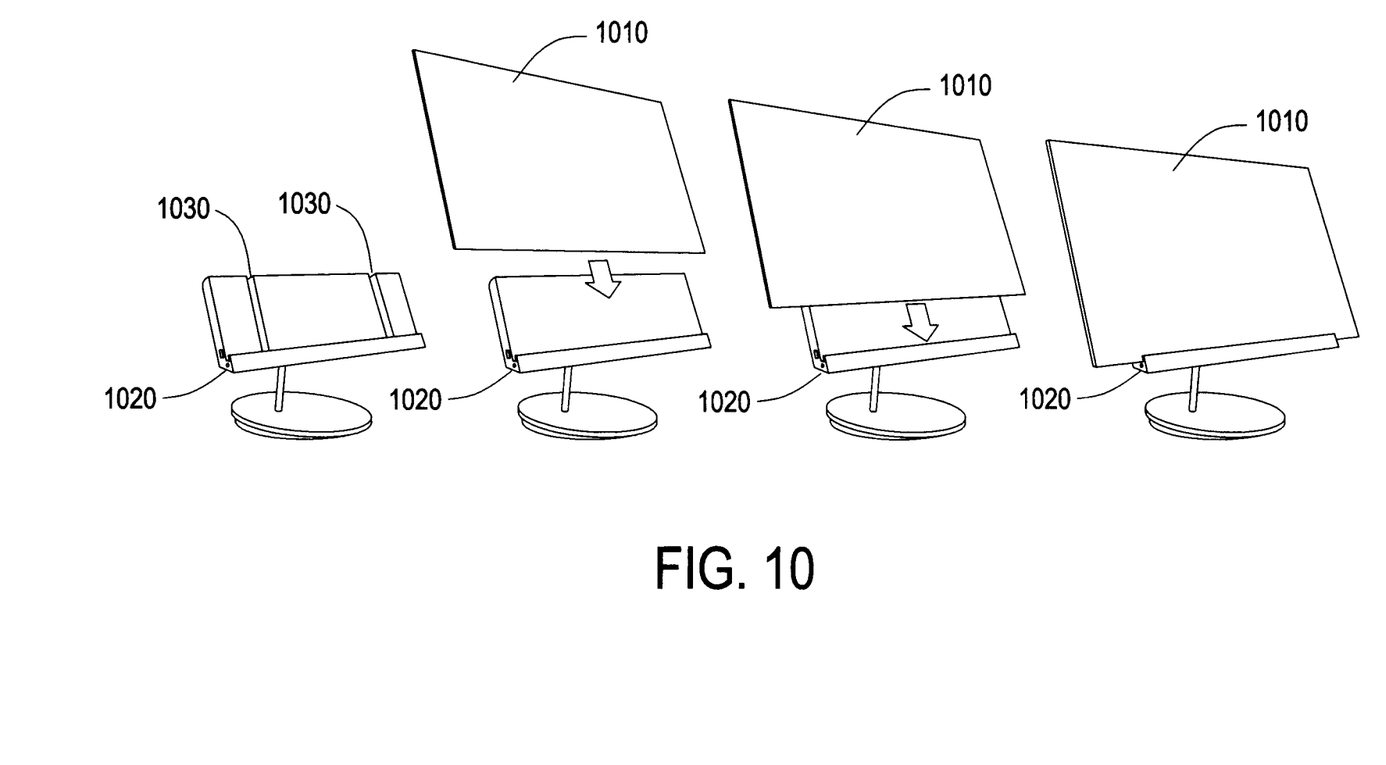
FIG. 10 illustrates an example of a display panel connecting to a dock.

Referring now to FIG. 10, an illustrated embodiment of a display panel 1010 connecting to a dock 1020 is shown. In one embodiment the dock 1020 contains a first fastening mechanism. The fastening mechanism may be located in the groove of the dock discussed herein. Additionally, the display panel 1010 contains a second fastening mechanism that is matched to the first fastening mechanism. For example, the fastening mechanism may be interlocking mechanisms made of plastic, metal, or a combination of elements to ensure a robust secure connection. Additionally or alternatively, an embodiment may utilize magnets as fastening mechanisms. For example, the dock 1020 may contain one or more magnets disposed within the lengthwise groove. Additionally, the display panel 1020 may have one or more magnets disposed in the base of the display panel. Thus, when the display panel is placed within the lengthwise groove, the magnets in the display panel and groove would attract each other and hold the display panel firmly in place.

In order to ensure proper alignment of the fastening mechanisms, an embodiment may utilize a guide system. For example, the display panel may have a first guide mechanism disposed on the back side of the panel, which is paired with a second guide mechanism disposed within the dock (e.g., on the back plate, see 307 of FIG. 3C). In one embodiment, the first and second guide mechanism may be a first and second magnet pair. For example, the display panel may include one or more magnets located at predetermined locations, which are matched to the one or more magnet locations on the dock. Additionally, the dock may have one or more magnet or magnet strips located on the back plate at predetermined locations such as that at 1030.

Thus, when a user attempts to slide the display panel 1010 down into the groove of the dock 1020, the magnet or magnet strip at 1030 will attract the magnets within the display device 1010. This ensures that proper alignment between the panel and the dock will take place. Because of the attraction of the magnets, the fastening mechanisms as well as the male and female connections, discussed herein, are accurately lined up with one another ensuring a proper seeding and latch of each. Thus, in one embodiment, as shown in the progression of FIG. 10, the display panel 1010 slides down the dock 1020 using the attraction of the magnets as a guide mechanism and is firmly secured in the groove of the dock via the latching mechanism discussed herein.

In one embodiment, the magnets (e.g., in either the display or the dock/housing) may be correlated or programmable magnets. Programmable magnets or correlated magnets are magnetic structures that incorporate correlated patterns of magnets with alternating polarity, designed to achieve a desired behavior. Correlated magnet pairs can be programmed to attract or repel with a prescribed force and engagement distance. Additionally, programmable magnets may attract or repel at certain a spatial orientation.

In one embodiment, correlated magnets may be programmed to interact only with another magnetic structure that has been coded to respond (e.g., specifically paired). This would allow an embodiment not only to align the display device, but assure it has proper orientation prior making the electrical connection. Using the programmable magnets, an embodiment may even create multi-pole structures comprising multiple magnetic elements of varying size, location, orientation, and saturation.

In a further embodiment, the programmable magnets may be developed from ferrites, rare-earth materials, ceramics, electromagnets, or any feasible magnetic structure. Moreover, the programmable effects may be scalable from very large permanent magnets to nanometer-scale devices.

Additionally or alternatively, an embodiment may utilize a mechanical guide mechanism, such as an interlocking rail, c-rail, t-shaped rail, or any interlocking mechanism that can be used as a guiding mechanism. By way of specific example, an embodiment may utilize a t-shaped slot running vertically along the back of the display panel 1010. The slot being paired, shape-wise, with a t-shaped protrusion on the dock 1020. The t-shaped protrusion may be, for example, located at each end of the dock such as at 1030.

Accordingly, as illustrated by the example embodiments and figures, an embodiment provide a system wherein a dock or all-in-one computer comprises a housing which contains essential components (e.g., power supply, scaler card, interface board, etc.) to a display device usually housed within the display device itself. The dock also having a connection device (e.g., male video connector) located in a groove running the length of the dock, the groove having open ends at each end. An embodiment then allows a display panel, to reside within the groove and connect via the connection device to the dock. Because the dock already contains the essential components, the display panel is no longer required to contain them thereby reducing the overall size and cost of the display panel.

The various embodiments described herein thus represent a technical improvement to the replacement and upgrading of display devices. Such as in one embodiment, which utilizes a guide system and latching system to ensure the display panel is securely fastened to the dock. The display panel needs to be securely fastened so that user interaction is similar to that of a typical display device.

As used herein, the singular "a" and "an" may be construed as including the plural "one or more" unless clearly indicated otherwise. Moreover, the connectors described herein may be any type. It is specifically noted that the use of "male" or "female" connector in the description and claims is to be interpreted broadly, i.e., a "male" connector may be replaced by a "female" connector, and vice versa, so long as an operative, physical connection is achieved.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An apparatus, comprising:
   a housing comprising a base and an upper element;
   the upper element comprising a groove running lengthwise and open at both ends, wherein the groove comprises a back plate and a bottom;
   a display connector disposed substantially centrally within the bottom of the groove; and an interface board within the housing and operatively coupled to the display connector.

2. The apparatus of claim 1, further comprising a power supply disposed within the housing operatively coupled to the interface board and a power connector.

3. The apparatus of claim 1, wherein the display connector is a connector selected from the group consisting of: one-link, mobile high definition link, HDBaseT, DiiVA, DisplayPort, high definition multimedia interface, serial digital interface, and digital visual interface.

4. The apparatus of claim 1, further comprising: at least one data port disposed on the housing.

5. The apparatus of claim 1, wherein the display connector is moveable about an axis coincident with the groove.

6. A system, comprising:
an image display device with a recessed display connector; and
an apparatus, the apparatus comprising:
a housing, comprising: a base and an upper element;
the upper element comprising a groove running lengthwise and open at both ends wherein the groove comprises a back plate and a bottom;
a protruding display connector disposed substantially centrally within the bottom of the groove; and
an interface board, within the housing and operatively coupled to the display connector;
wherein the image display device is attached to the groove of the apparatus via the recessed and protruding display connector.

7. The system of claim 6, wherein the image display rests in the groove of the apparatus.

8. The system of claim 7, wherein the groove accepts image display devices of varying size.

9. The system of claim 6, further comprising a power supply disposed within the housing operatively coupled to the interface board and a power connector.

10. The system of claim 6, wherein the recessed and protruding display connectors are selected from the group consisting of: one-link, mobile high definition link, HDBaseT, DiiVA, DisplayPort, high definition multimedia interface, serial digital interface, and digital visual interface.

11. The system of claim 6, further comprising: at least one data port disposed on the housing, wherein the at least one data port is selected from the group consisting of: a display port, a serial advanced technology attachment, an external serial advanced technology attachment, a FireWire port, a serial port, a small computer system interface, and a universal serial bus.

12. The system of claim 6, further comprising a scaler disposed within the housing operatively coupled to the interface board,
wherein the scaler is a universal scaler, the universal scaler accommodating image display devices of varying size.

13. The system of claim 6, further comprising an intermediate element;
the intermediate element coupled to the base and the upper element;
wherein the intermediate element comprises at least one cable, the cable being selected from the group consisting of data cable and power cable.

14. A system, comprising:
a computer system, comprising:
a processor and a memory device operatively coupled to the processor;
an image display device with a female display connector; and
an apparatus, operatively coupled to the computer system, the apparatus comprising:
a housing, comprising: a base and an upper element;
the upper element comprising a groove running lengthwise and open at both ends wherein the groove comprises a back plate and a bottom;
a male display connector disposed substantially centrally within the bottom of the groove; and
an interface board, within the housing and operatively coupled to the display connector;
wherein the image display device is attached to the apparatus via the male and female display connector.

15. The system of claim 14, wherein the image display rests in the groove of the apparatus.

16. The system of claim 15, wherein the groove accepts image display devices of varying size.

17. The system of claim 14, further comprising a power supply disposed within the housing operatively coupled to the interface board and a power connector.

18. The system of claim 14, wherein the first and second display connectors are selected from the group consisting of: one-link, mobile high definition link, HDBaseT, DiiVA, DisplayPort, high definition multimedia interface, serial digital interface, and digital visual interface.

19. The system of claim 14, further comprising: at least one data port disposed on the housing.

20. The system of claim 14, further comprising a scaler disposed within the housing operatively coupled to the interface board,
wherein the scaler is a universal scaler, the universal scaler accommodating image display devices of varying size.

* * * * *